US010313702B2

(12) United States Patent
Pandit et al.

(10) Patent No.: US 10,313,702 B2
(45) Date of Patent: Jun. 4, 2019

(54) INTER-VIEW PREDICTION

(75) Inventors: Purvin Bibhas Pandit, Franklin Park, NJ (US); Peng Yin, West Windsor, NJ (US); Cristina Gomila, Princeton, NJ (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 862 days.

(21) Appl. No.: 12/451,034

(22) PCT Filed: Apr. 23, 2008

(86) PCT No.: PCT/US2008/005237
§ 371 (c)(1),
(2), (4) Date: Oct. 23, 2009

(87) PCT Pub. No.: WO2008/133910
PCT Pub. Date: Nov. 6, 2008

(65) Prior Publication Data
US 2010/0142614 A1 Jun. 10, 2010

Related U.S. Application Data

(60) Provisional application No. 60/925,956, filed on Apr. 25, 2007.

(51) Int. Cl.
*H04N 7/12* (2006.01)
*H04N 11/02* (2006.01)
(Continued)

(52) U.S. Cl.
CPC ........... *H04N 19/59* (2014.11); *H04N 19/105* (2014.11); *H04N 19/597* (2014.11); *H04N 19/70* (2014.11)

(58) Field of Classification Search
USPC ............ 375/240.01, 240.02, 240.12, 240.17; 348/48
See application file for complete search history.

(56) References Cited

U.S. PATENT DOCUMENTS 5,270,813 A 12/1993 Puri et al.
6,055,012 A * 4/2000 Haskell et al. ................. 348/48
(Continued)

FOREIGN PATENT DOCUMENTS

WO WO2007047736 4/2007

OTHER PUBLICATIONS

Fehn et al.: "Asymmteric Coding of Stereoscopic Video for Mobile 3DTV," Joint Video Team (JVT) of ISO/IEC MPEG & ITU-T VCEG, doc. JVT-Y082, Oct. 21, 2007, pp. 1-9.
Flierl et al.: "Multi-View Video Compression," Exploiting Inter-Image Similarities, IEEE Signal Processing Magazine, Draft Jul. 27, 2007, pp. 1-21.
(Continued)

*Primary Examiner* — Chikaodili E Anyikire
(74) *Attorney, Agent, or Firm* — Brian J. Dorini; Ronald Kolczynski

(57) ABSTRACT

At least one disclosed method and apparatus relate to inter-view prediction with different resolution reference picture. A particular method includes accessing at least a portion of an encoded picture (614), the encoded picture being from a particular view of multiple views, and the portion being encoded at a particular resolution. The method further includes determining a particular view level based on the particular view (614), determining the particular resolution based on the particular view level (606), and decoding the portion based on the particular resolution (630).

7 Claims, 13 Drawing Sheets

(51) Int. Cl.
*H04N 11/04* (2006.01)
*H04N 19/59* (2014.01)
*H04N 19/597* (2014.01)
*H04N 19/105* (2014.01)
*H04N 19/70* (2014.01)

(56) References Cited

U.S. PATENT DOCUMENTS

| | | | |
|---|---|---|---|
| 8,040,952 B2* | 10/2011 | Park et al. | 375/240.16 |
| 2004/0086186 A1 | 5/2004 | Kyusojin et al. | |
| 2005/0169545 A1 | 8/2005 | Ratakonda et al. | |
| 2006/0222079 A1* | 10/2006 | Park | H04N 21/21805 375/240.16 |
| 2006/0227871 A1 | 10/2006 | Budagavi | |
| 2007/0058713 A1 | 3/2007 | Shen et al. | |
| 2007/0086666 A1 | 4/2007 | Bruls | |
| 2007/0206673 A1 | 9/2007 | Cipolli et al. | |
| 2008/0117985 A1* | 5/2008 | Chen | H04N 19/597 375/240.26 |
| 2009/0185616 A1* | 7/2009 | Pandit | H04N 19/597 375/240.01 |

OTHER PUBLICATIONS

Kimata et al.: "Inter-View Prediction with Down-Sampled Reference Pictures," Joint Video Team (JVT) of ISO/IEC MPEG & ITU-T VECEG, doc. JVT-W079, Apr. 21, 2007. pp. 1-11.
Pandit et al.: "Reduced Resolution Update for MVC," Joint Video Team (JVT) of ISO/IEC MPEG & ITU-T VCEG, doc. JVT-W092, Apr. 21, 2007, pp. 1-14.
Vetro et al.: "Joint Multiview Video Model (JMVM) 3.0," Joint Video Team (JVT) of ISO/IEC JTC 1/SC 29/WG11 N8754, Marrakech, Morocco, Jan. 2007, pp. 1-9.
JVT: "Index of/av-arch/jvt-site/2007_04_SanJose," Internet Citation, Apr. 2007, San Jose, California, pp. 1-5.
International Search Report, dated Dec. 4, 2008.
Anthony Vetro, et al., "Joint Draft 2.0 on Multiview Video Coding", Joint Video Team (JVT) of ISO/IEC MPEG & ITU-T VCEG (ISO/IEC JTC1/SC29/WG11 and ITU-T SG16 Q.6, JVT-V209, Jan. 13-19, 2007, pp. 1-29, Marrakech, Morocco.
Wiegand et al., Overview of the H.264/AVC Video Coding Standard, IEEE Transactions on Circuits and Systems for Video Technology, vol. 13, No. 7, Jul. 2003, pp. 560-576.
List et al., Adaptive Deblocking Filter, IEEE Transactions on Circuits and Systems for Video Technology, vol. 13, No. 7, Jul. 2003, pp. 614-619.

* cited by examiner

INTER-VIEW PREDICTION

CROSS-REFERENCE TO RELATED APPLICATIONS

This application claims the benefit, under 35 U.S.C. § 365 of International Application PCT/US2008/005237 filed Apr. 23, 2008, which was published in accordance with PCT Article 21(2) on Nov. 6, 2008 in English and which claims the benefit of U.S. provisional patent application No. 60/925,956 filed Apr. 25, 2007.

TECHNICAL FIELD

The present principles relate generally to video encoding and decoding.

BACKGROUND

Inter-view prediction is used, for example, in encoding pictures from multiple views, and may provide coding efficiencies. Encoded pictures may be encoded at one of various resolutions, and pictures may be downsampled to reduce the resolution.

SUMMARY

According to a general aspect, at least a portion of an encoded picture is accessed. The encoded picture is from a particular view of multiple views, and the portion was encoded at a particular resolution. A particular view level is determined based on the particular view. The particular resolution is determined based on the particular view level. The portion is decoded based on the particular resolution.

According to another general aspect, a particular view level is determined based on a particular view for at least a portion of a picture. The particular view is from multiple views. A particular resolution is determined for the portion based on the particular view level. The port ion is encoded based on the particular resolution.

According to another general aspect, a video signal structure or a formatted video signal includes an encoded representation of at least a portion of a picture. The picture is from a particular view of multiple views. The video signal structure or the formatted video signal also includes information indicating a view level position in a scalability hierarchy for the particular view.

According to another general aspect, at least a portion of a picture is accessed. The picture is from a particular view of multiple views in a multi-view encoding system. The particular view is identified. A resolution is determined at which the portion is to be encoded. The resolution corresponds to the particular view. The portion is encoded at the resolution.

According to another general aspect, at least a portion of an encoded picture is accessed. The picture is from a particular view of multiple views in a multi-view encoding system. The particular view is identified. A particular resolution is identified at which the portion is encoded. The particular resolution corresponds to the particular view. The portion is decoded at the particular resolution.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
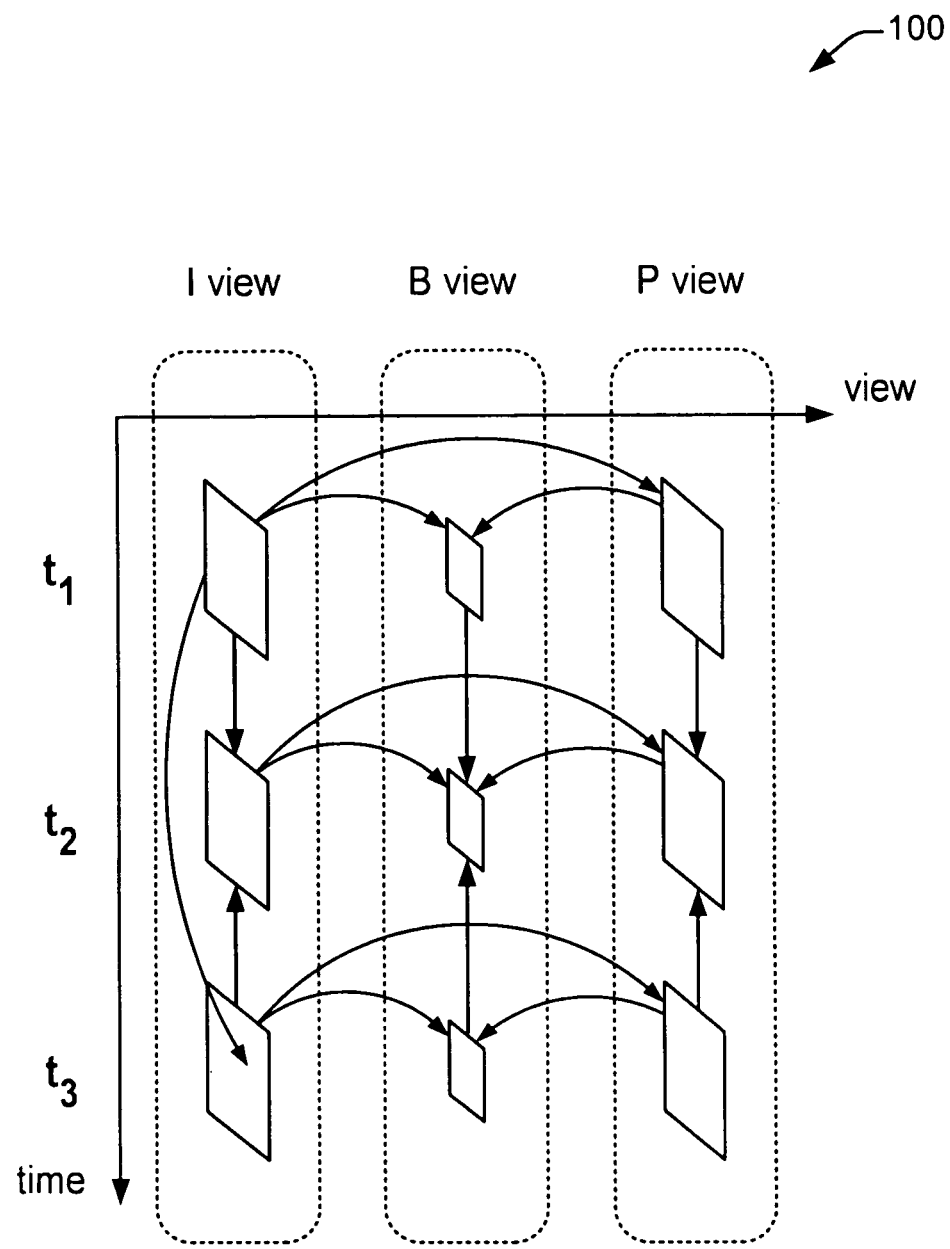
FIG. 1 is a diagram showing an exemplary prediction structure for multi-view video coding (MVC)

At least one implementation is directed to methods and apparatus for interview prediction with a different resolution reference picture. It will thus be appreciated that those skilled in the art will be able to devise various arrangements that, although not explicitly described or shown herein, embody the present principles of one or more implementations discussed in this application and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" (or "one implementation") or "an embodiment" (or "an implementation") of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard, and may also be applied in a context not involving any standard. Thus, for example, the concepts, features, and implementations discussed in this application may be utilized with respect to other video coding standards, recommendations, and extensions thereof, including extensions of the MPEG-4 AVC standard, while maintaining the spirit of the present principles.

Further, it is to be appreciated that while one or more other embodiments of the present principles are described herein with respect to the multi-view video coding extension of the MPEG-4 AVC standard, the present principles are not limited to solely this extension and/or this standard and, thus, may be utilized with respect to other video coding standards, recommendations, and extensions thereof relating to multi-view video coding, while maintaining the spirit of the present principles. Multi-view video coding (MVC) is the compression framework for the encoding of multi-view sequences. A Multi-view Video Coding (MVC) sequence is a set of two or more video sequences that capture the same scene from a different view point.

Also, it is to be appreciated that while one or more other embodiments of the present principles are described herein that use depth information with respect to video content, the present principles are not limited to such embodiments and, thus, other embodiments may be implemented that do not use depth information, while maintaining the spirit of the present principles.

Additionally, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level, View Parameter Set (VPS), and Network Abstraction Layer (NAL) unit header level.

Moreover, as used herein, a "view scalable layer" refers to a layer that includes a set of the coded pictures in a sequence. View scalable layers may be numbered with non-negative integers. A layer having a larger layer number is a higher layer than a layer having a smaller layer number.

Inter-View Prediction with Downsampled Reference Picture

A particular technique for inter-view prediction may be applied in the case that each view in a multi-view sequence has a different spatial resolution. This particular technique may specify how inter-view prediction works when referring to a higher resolution reference picture. However, this particular technique is strict in the sense that I and P views should be coded in the original resolution (as specified in JMVM (Joint Multiview Video Model)), and only B views are allowed to be coded in the downsampled resolution. The downsampled ratio is fixed to be 2 for both the horizontal direction and the vertical direction. For a B view, if the B view is coded in a lower resolution, the full resolution picture is loaded from the reference picture buffer and is downsampled for inter-view prediction.

There are at least two limitations with the above particular technique. First, if we have hierarchical B views, with the provided syntax, we may have cases that some B views coded at a high resolution refer to reference views that are coded at a low resolution. Second, the syntax only allows a fixed downsampling ratio equal to 2 for both horizontal and vertical directions. However, with different contents and applications, we may want to have some flexibility to specify different resolutions for horizontal and vertical directions.

One example of a prediction structure that can be used with the particular technique is shown in FIG. 1. Turning to FIG. 1, an exemplary prediction structure for multi-view video coding (MVC) is indicated generally by the reference numeral 100. The structure of FIG. 1 is largely self-explanatory, but the following brief description is provided. The structure 100 shows a set of I views which, by definition, have no inter-view prediction. The structure 100 also shows a set of B views and a set of P views, both of which may use inter-view prediction. The set of I views includes an I frame at time t1. The arrows indicate that a picture is used as a reference picture for another picture. The arrow starts at the reference picture and ends with an arrowhead at the picture that uses this reference picture. Thus, for example, at time t1, the B view uses both the P view and the I view as reference images. As another example, at time t2, the B view uses as reference pictures the I and P views of time t2, and the B views of times t1 and t3.

Figure 2:
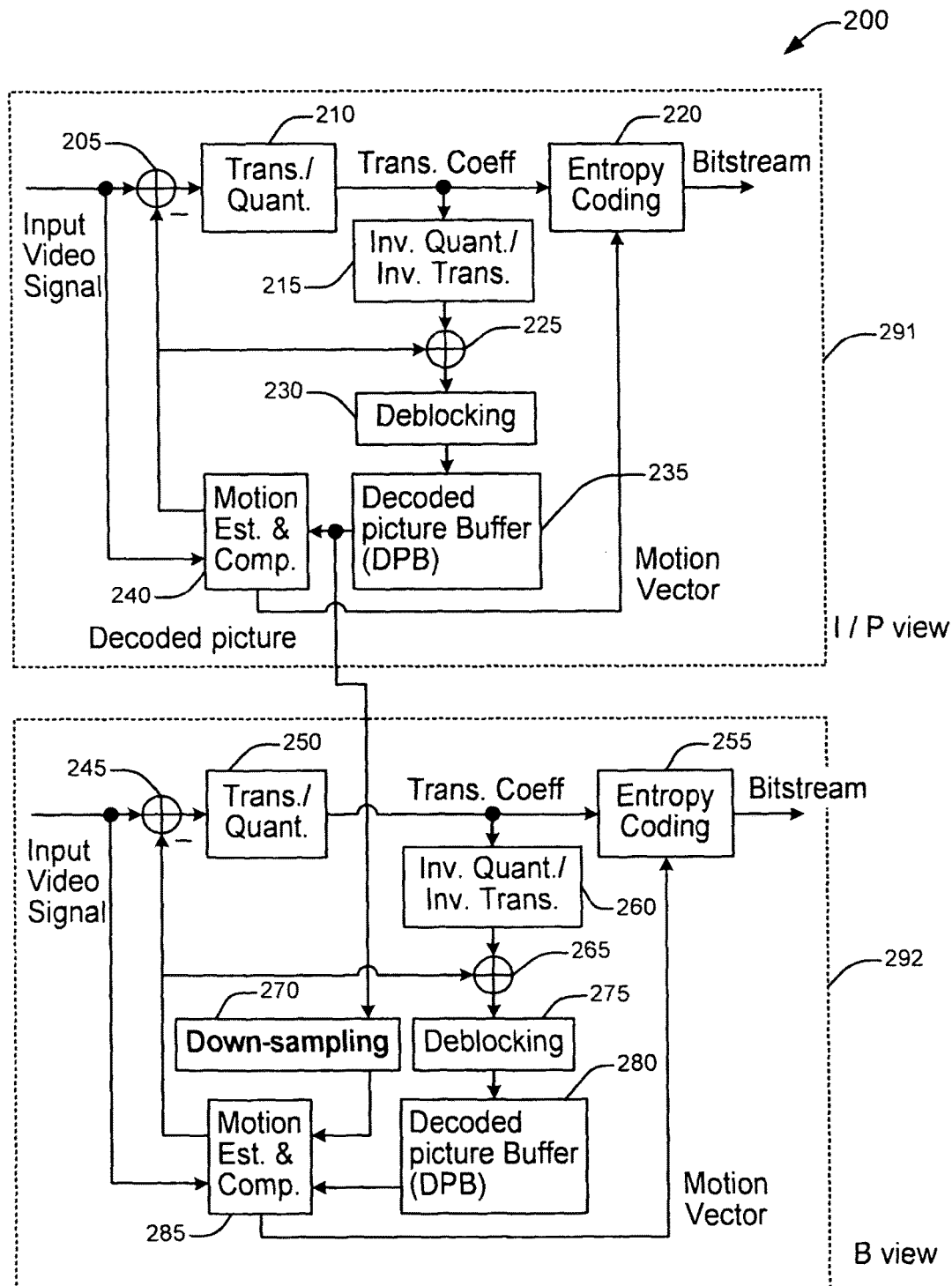
FIG. 2 is a block diagram showing an encoder that performs reference picture downsampling when encoding B views with lower spatial resolution.

An exemplary encoder for the prediction structure 100 of FIG. 1 is shown in FIG. 2. Turning to FIG. 2, an encoder that performs reference picture downsampling when encoding B views with lower spatial resolution is indicated generally by the reference numeral 200. The encoder 200 includes an I/P view portion 291 and a B view portion 292.

The encoder 200 includes a combiner 205 having an output connected in signal communication with an input of a transformer/quantizer 210. An output of the transformer/quantizer 210 is connected in signal communication with an input of an inverse quantizer/inverse transformer 215 and a second input of an entropy coder 220.

An output of the inverse quantizer/inverse transformer 215 is connected in signal communication with a first non-inverting input of a combiner 225. An output of the combiner 225 is connected in signal communication with an input of a deblocking filter 230. An output of the deblocking filter 230 is connected in signal communication with an input of a decoded picture buffer (DPB) 235. An output of the decoded picture buffer 235 is connected in signal communication with a first input of a motion estimator and compensator 240. A first output of the motion estimator and compensator 240 is connected in signal communication with an inverting input of the combiner 205 and a second non-inverting input of the combiner 225. A second output of the motion estimator and compensator 240 is connected in signal communication with a first input of the entropy coder 220.

The first output of the decoded picture buffer 235 is also connected in signal communication with an input of a downsampler 270. An output of the downsampler 270 is connected in signal communication with a second input of a motion estimator and compensator 285. A first output of the motion estimator and compensator 285 is connected in signal communication with an inverting input of a combiner 245 and a second non-inverting input of the combiner 265. An output of the combiner 245 is connected in signal communication with an input of a transformer/quantizer 250. An output of the transformer/quantizer 250 is connected in signal communication with an input of an inverse quantizer/inverse transformer 260 and a second input of an entropy coder 255.

An output of the inverse quantizer/inverse transformer 260 is connected in signal communication with a first input of a combiner 265. An output of the combiner 265 is connected in signal communication with an input of a deblocking filter 275. An output of the deblocking filter 275 is connected in signal communication with an input of a decoded picture buffer 280. An output of the decoded picture buffer 280 is connected in signal communication with a first input of a motion estimator and compensator 285. A second output of the motion estimator and compensator 285 is connected in signal communication with a first input of the entropy coder 255.

A first input of the combiner 205 and a second input of the motion estimator and compensator 240 are available as input of the encoder 200, for receiving an input video signal. An output of the entropy coder 220 is available as an output of the encoder 200, for outputting a bitstream.

A first input of the combiner 245 and a second input of the motion estimator and compensator 285 are available as input of the encoder 200, for receiving an input video signal. An output of the entropy coder 255 is available as an output of the encoder 200, for outputting a bitstream.

The syntax of an implementation to specify the spatial resolution is shown as in TABLE 1.

TABLE 1

| seq_parameter_set_mvc_extension( ) { | C | Descriptor |
|---|---|---|
|   num_views_minus_1 | | ue(v) |
|   num_downsampled_views_minus_1 | | ue(v) |
|   for(i = 0; i <= num_views_minus_1; i++) | | |
|     view_id[i] | | ue(v) |
|   for(i = 0; i <= num_views_minus_1; i++) { | | |
|     num_anchor_refs_l0[i] | | ue(v) |
|     for( j = 0; j < num_anchor_refs_l0[i]; j++ ) | | |
|       anchor_ref_l0[i][j] | | ue(v) |
|     num_anchor_refs_l1[i] | | ue(v) |
|     for( j = 0; j < num_anchor_refs_l1[i]; j++ ) | | |
|       anchor_ref_l1[i][j] | | ue(v) |
|   } | | |
|   for(i = 0; i <= num_views_minus_1; i++) { | | |
|     num_non_anchor_refs_l0[i] | | ue(v) |
|     for( j = 0; j < num_non_anchor_refs_l0[i]; j++ ) | | |
|       non_anchor_ref_l0[i][j] | | ue(v) |
|     num_non_anchor_refs_l1[i] | | ue(v) |
|     for( j = 0; j < num_non_anchor_refs_l1[i]; j++ ) | | |
|       non_anchor_ref_l1[i][j] | | ue(v) |
|   } | | |
|   for(i = 0; i <= num_downsampled_views_minus_1; i++) | | |
|     downsampled_view_id[i] | | ue(v) |
| } | | |

There are at least two limitations with the above implementation. First, if we have hierarchical B views, with the provided syntax, we may have cases that some B views coded at a high resolution refer to reference views that are coded at a low resolution. Second, the syntax only allows a fixed downsampling ratio equal to 2 for both horizontal and vertical directions. However, with different contents and applications, we may want to have some flexibility to specify different resolutions for horizontal and vertical directions.

View Level in JMVM

In JMVM (Joint Multiview Video Model), view level (the level of view scalability) is described by syntax view_level in network abstraction layer (NAL) unit header, as shown in TABLE 2. View level can also be derived from view dependency information in the sequence parameter set (SPS), as shown in TABLE 3. In the JMVM specification, the view level has the following constraints: the decoding of any access unit with view_level equal to currVI shall be independent of all access units with view_level greater than or equal to currVI. Let vld be any value larger or equal to Vmin, where Vmin is the minimum value of view_level in the coded video sequence. The bitstream that would be obtained by discarding all NAL units with view_level greater than vld conforms to the standard.

TABLE 2

| nal_unit_header_svc_mvc_extension( ) { | C | Descriptor |
|---|---|---|
| svc_mvc_flag | All | u(1) |
| if (!svc_mvc_flag) { | | |
| reserved_zero_bit | All | u(1) |
| priority_id | All | u(6) |
| temporal_level | All | u(3) |
| dependency_id | All | u(3) |
| quality_level | All | u(2) |
| idr_flag | All | u(1) |
| layer_base_flag | All | u(1) |
| use_base_prediction_flag | All | u(1) |
| discardable_flag | All | u(1) |
| reserved_zero_three_bits | All | u(3) |
| tl0_frame_idx_present_flag | All | u(1) |
| } else { | | |
| temporal_level | All | u(3) |
| view_level | All | u(3) |
| anchor_pic_flag | All | u(1) |
| view_id | All | u(10) |
| idr_flag | All | u(1) |
| reserved_zero_five_bits | All | u(5) |
| } | | |
| nalUnitHeaderBytes += 3 | | |
| } | | |

TABLE 3

| seq_parameter_set_mvc_extension( ) { | C | Descriptor |
|---|---|---|
| num_views_minus_1 | | ue(v) |
| for(i = 0; i <= num_views_minus_1; i++) | | |
| view_id[i] | | ue(v) |
| for(i = 0; i <= num_views_minus_1; i++) { | | |
| num_anchor_refs_l0[i] | | ue(v) |
| for( j = 0; j < num_anchor_refs_l0[i]; j++ ) | | |
| anchor_ref_l0[i][j] | | ue(v) |
| num_anchor_refs_l1[i] | | ue(v) |
| for( j = 0; j < num_anchor_refs_l1[i]; j++ ) | | |
| anchor_ref_l1[i][j] | | ue(v) |
| } | | |
| for(i = 0; i <= num_views_minus_1; i++) { | | |
| num_non_anchor_refs_l0[i] | | ue(v) |
| for( j = 0; j < num_non_anchor_refs_l0[i]; j++ ) | | |
| Non_anchor_ref_l0[i][j] | | ue(v) |
| num_non_anchor_refs_l1[i] | | ue(v) |
| for( j = 0; j < num_non_anchor_refs_l1[i]; j++ ) | | |
| Non_anchor_ref_l1[i][j] | | ue(v) |
| } | | |
| } | | |

Figure 3:
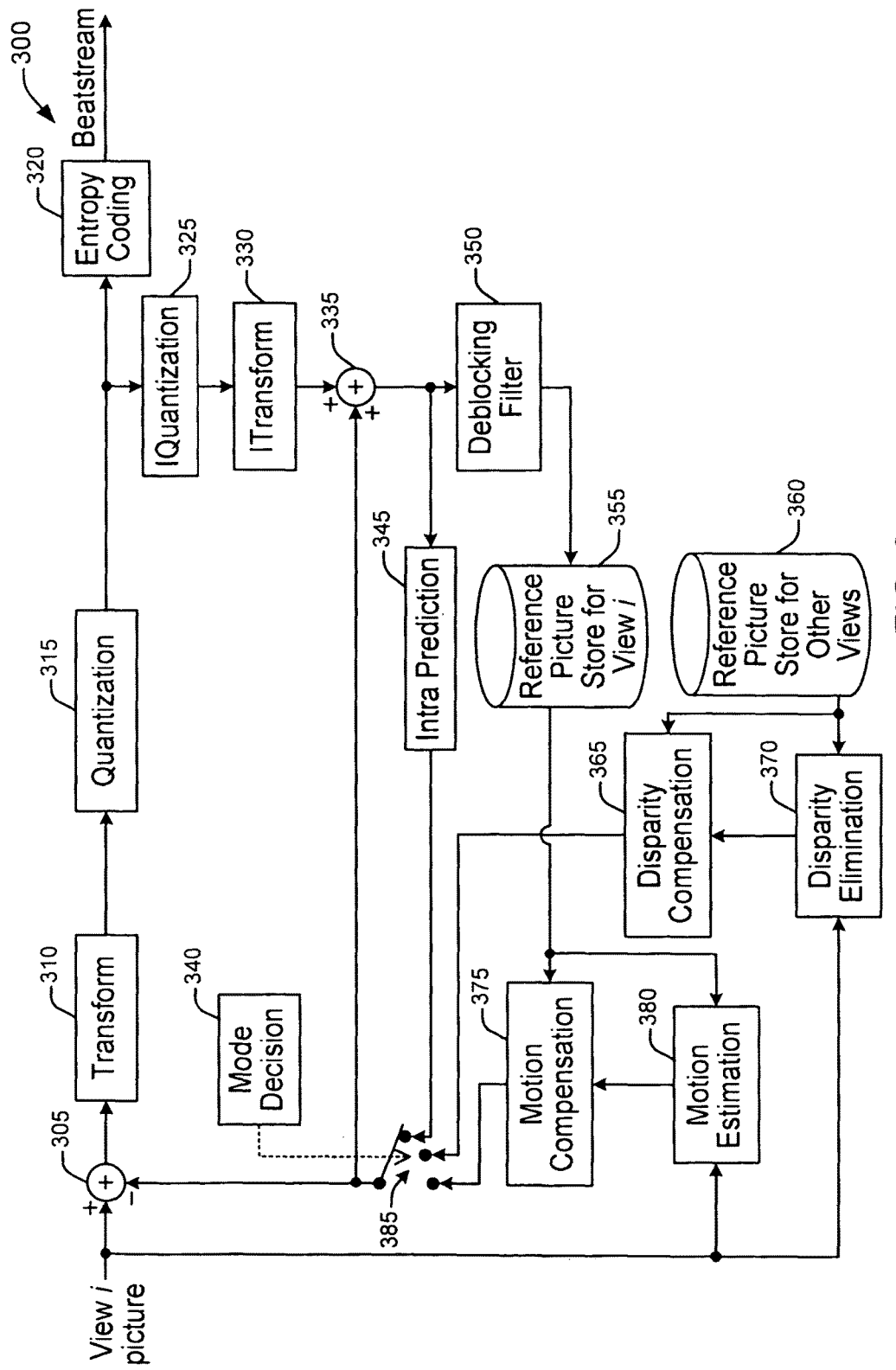
FIG. 3 is a block diagram for an exemplary Multi-view Video Coding (MVC) encoder to which the present principles may be applied, in accordance with an embodiment of the present principles.

Turning to FIG. 3, an exemplary Multi-view Video Coding (MVC) encoder is indicated generally by the reference numeral 300. The encoder 300 includes a combiner 305 having an output connected in signal communication with an input of a transformer 310. An output of the transformer 310 is connected in signal communication with an input of quantizer 315. An output of the quantizer 315 is connected in signal communication with an input of an entropy coder 320 and an input of an inverse quantizer 325. An output of the inverse quantizer 325 is connected in signal communication with an input of an inverse transformer 330. An output of the inverse transformer 330 is connected in signal communication with a first non-inverting input of a combiner 335. An output of the combiner 335 is connected in signal communication with an input of an intra predictor 345 and an input of a deblocking filter 350. An output of the deblocking filter 350 is connected in signal communication with an input of a reference picture store 355 (for view i). An output of the reference picture store 355 is connected in signal communication with a first input of a motion compensator 375 and a first input of a motion estimator 380. An output of the motion estimator 380 is connected in signal communication with a second input of the motion compensator 375

An output of a reference picture store 360 (for other views) is connected in signal communication with a first input of a disparity estimator 370 and a first input of a disparity compensator 365. An output of the disparity estimator 370 is connected in signal communication with a second input of the disparity compensator 365.

An output of the entropy decoder 320 is available as an output of the encoder 300. A non-inverting input of the combiner 305 is available as an input of the encoder 300, and is connected in signal communication with a second input of the disparity estimator 370, and a second input of the motion estimator 380. An output of a switch 385 is connected in signal communication with a second non-inverting input of the combiner 335 and with an inverting input of the combiner 305. The switch 385 includes a first input connected in signal communication with an output of the motion compensator 375, a second input connected in signal communication with an output of the disparity compensator 365, and a third input connected in signal communication with an output of the intra predictor 345.

A mode decision module 340 has an output connected to the switch 385 for controlling which input is selected by the switch 385.

Figure 4:
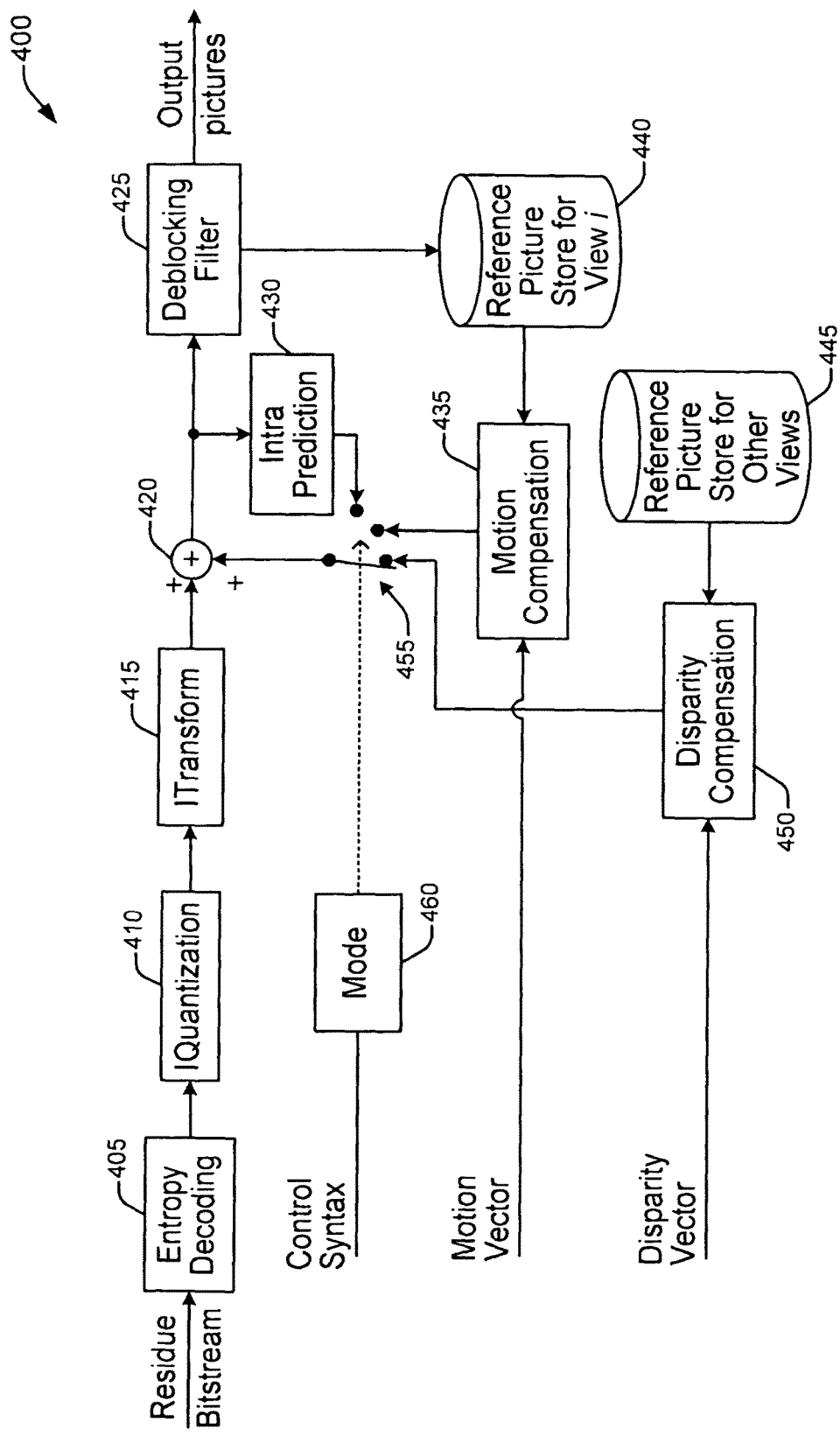
FIG. 4 is a block diagram for an exemplary Multi-view Video Coding (MVC) decoder to which the present principles may be applied, in accordance with an embodiment of the present principles.

Turning to FIG. 4, an exemplary Multi-view Video Coding (MVC) decoder is indicated generally by the reference numeral 400. The decoder 400 includes an entropy decoder 405 having an output connected in signal communication with an input of an inverse quantizer 410. An output of the inverse quantizer is connected in signal communication with an input of an inverse transformer 415. An output of the inverse transformer 415 is connected in signal communication with a first non-inverting input of a combiner 420. An output of the combiner 420 is connected in signal communication with an input of a deblocking filter 425 and an input of an intra predictor 430. An output of the deblocking filter 425 is connected in signal communication with an input of a reference picture store 440 (for view i). An output of the reference picture store 440 is connected in signal communication with a first input of a motion compensator 435.

An output of a reference picture store 445 (for other views) is connected in signal communication with a first input of a disparity compensator 450.

An input of the entropy coder 405 is available as an input to the decoder 400, for receiving a residue bitstream. Moreover, an input of a mode module 460 is also available as an input to the decoder 400, for receiving control syntax to control which input is selected by the switch 455. Further, a second input of the motion compensator 435 is available as an input of the decoder 400, for receiving motion vectors. Also, a second input of the disparity compensator 450 is available as an input to the decoder 400, for receiving disparity vectors.

An output of a switch 455 is connected in signal communication with a second non-inverting input of the combiner 420. A first input of the switch 455 is connected in signal communication with an output of the disparity compensator 450. A second input of the switch 455 is connected in signal communication with an output of the motion compensator 435. A third input of the switch 455 is connected in signal communication with an output of the intra predictor 430. An output of the mode module 460 is connected in signal communication with the switch 455 for controlling which input is selected by the switch 455. An output of the deblocking filter 425 is available as an output of the decoder 400.

In an embodiment, we propose an improvement to inter-view prediction using a dynamic resolution reference picture. Moreover, in an embodiment, we propose constraints on spatial resolution based on view scalability and we also allow a flexible downsampling ratio for horizontal and vertical directions. Further, in an embodiment, we propose improved syntax and semantics on how inter-view prediction using different resolutions works.

In an embodiment, instead of specifying the spatial resolution based on view types, where only B views are allowed to have a smaller resolution, we propose to specify the constraints based on view level.

In an embodiment, we specify the following constraints on the spatial resolution of each view. Let vld be any value larger or equal to Vmin, where Vmin is the minimum value of view level in the coded video sequence. For any view level larger than vld, its spatial resolution is equal or less than that of vld.

In another embodiment, we add the following further constraints: for any view level equal to vld, its spatial resolution is equal to that of vld.

In yet another embodiment, we add the following further constraints: only the highest view level can have the lowest spatial resolution.

In at least one implementation, we also allow flexible downsampling ratio for horizontal direction or vertical direction.

In one embodiment, we fix the number of spatial resolution downsampling allowed for coding each view. TABLE 4 shows such an example.

TABLE 4

| Seq_parameter_set_mvc_extension( ) { | C | Descriptor |
|---|---|---|
| num_views_minus_1 | | ue(v) |
| for(i = 0; i <= num_views_minus_1; i++) | | |
| { | | |
|    view_id[i] | | ue(v) |
|    view_res [i] | | ue(v) |
| } | | |
| for(i = 0; i <= num_views_minus_1; i++) { | | |
|    num_anchor_refs_l0[i] | | ue(v) |
|    for( j = 0; j < num_anchor_refs_l0[i]; j++ ) | | |
|      anchor_ref_l0[i][j] | | ue(v) |
|    num_anchor_refs_l1[i] | | ue(v) |
|    for( j = 0; j < num_anchor_refs_l1[i]; j++ ) | | |
|      anchor_ref_l1[i][j] | | ue(v) |
| } | | |
| for(i = 0; i <= num_views_minus_1; i++) { | | |
|    num_non_anchor_refs_l0[i] | | ue(v) |
|    for( j = 0; j < num_non_anchor_refs_l0[i]; j++ ) | | |
|      non_anchor_ref_l0[i][j] | | ue(v) |
|    num_non_anchor_refs_l1[i] | | ue(v) |
|    for( j = 0; j < num_non_anchor_refs_l1[i]; j++ ) | | |
|      non_anchor_ref_l1[i][j] | | ue(v) |
| } | | |
| } | | | view_res [i] specify the spatial resolution scale of the view with view_id[i]. The syntax element of view_res is defined in TABLE 5.

TABLE 5

| view_res | horizontal scale | vertical scale |
|---|---|---|
| 0 | full | full |
| 1 | half | full |
| 2 | full | half |
| 3 | half | half |

In another embodiment, we specify the scaling ratio for horizontal and vertical resolution respectively. TABLE 6 shows such an example.

TABLE 6

| Seq_parameter_set_mvc_extension( ) { | C | Descriptor |
|---|---|---|
| num_views_minus_1 | | ue(v) |
| for(i = 0; i <= num_views_minus_1; i++) | | |
| { | | |
|    view_id [i] | | ue(v) |
|    downsampling_flag [i] | | u(1) |
|    if (downsample_flag [i] ) | | |
|    { | | |
|      horizontal_scale [i] | | ue(v) |
|      vertical_scale [i] | | ue(v) |
|    } | | |
| } | | |
| for(i = 0; i <= num_views_minus_1; i++) { | | |
|    num_anchor_refs_l0[i] | | ue(v) |
|    for( j = 0; j < num_anchor_refs_l0[i]; j++ ) | | |
|      anchor_ref_l0[i][j] | | ue(v) |
|    num_anchor_refs_l1[i] | | ue(v) |
|    for( j = 0; j < num_anchor_refs_l1[i]; j++ ) | | |
|      anchor_ref_l1[i][j] | | ue(v) |
| } | | |
| for(i = 0; i <= num_views_minus_1; i++) { | | |
|    num_non_anchor_refs_l0[i] | | ue(v) |
|    for( j = 0; j < num_non_anchor_refs_l0[i]; j++ ) | | |
|      non_anchor_ref_l0[i][j] | | ue(v) |
|    num_non_anchor_refs_l1[i] | | ue(v) |
|    for( j = 0; j < num_non_anchor_refs_l1[i]; j++ ) | | |
|      non_anchor_ref_l1[i][j] | | ue(v) |
| } | | |
| } | | | downsampling_flag [i] equal to 1 specify the downsampling is applied to the view with view_id[i]. downsampling_flag [i] equal to 0 specify the downsampling is not applied to the view with view_id[i].

horizontal_scale [i] specify the horizontal downsampling scale of the view with view_id[i].

vertical_scale [i] specify the vertical downsampling scale of the view with view_id[i].

As a consequence of the above discussion, the inter-view reference selection is affected. The layers are ordered hierarchically based on their dependency on each other so that any picture (belonging to a view "i") in a view scalable hierarchical layer shall not be predicted from any picture (belonging to another view "j") in a higher view scalable hierarchical layer.

Figure 5A:
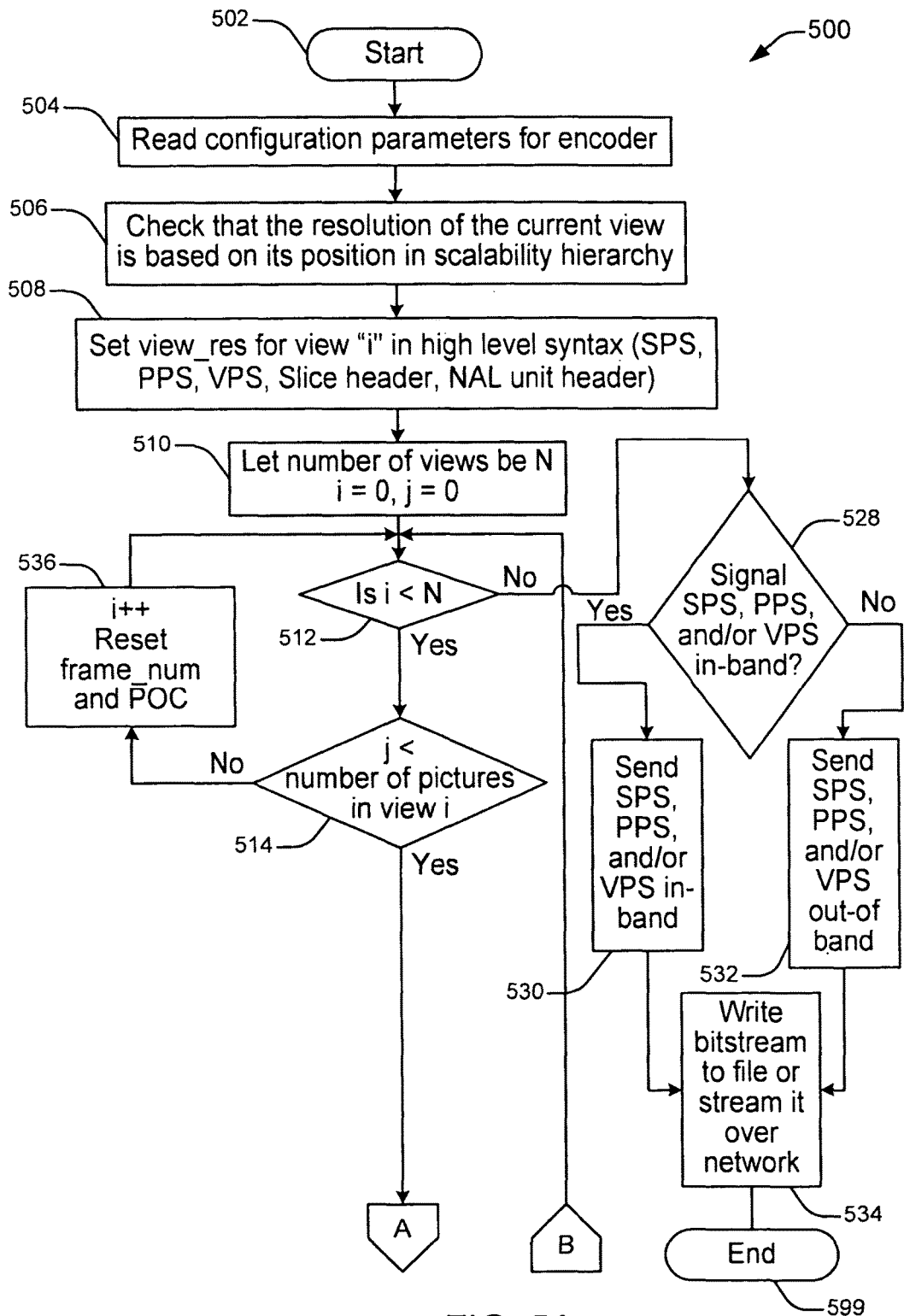
FIGS. 5A and 5B are a flow diagram for an exemplary method for encoding a picture, in accordance with an embodiment of the present principles.
Figure 5B:
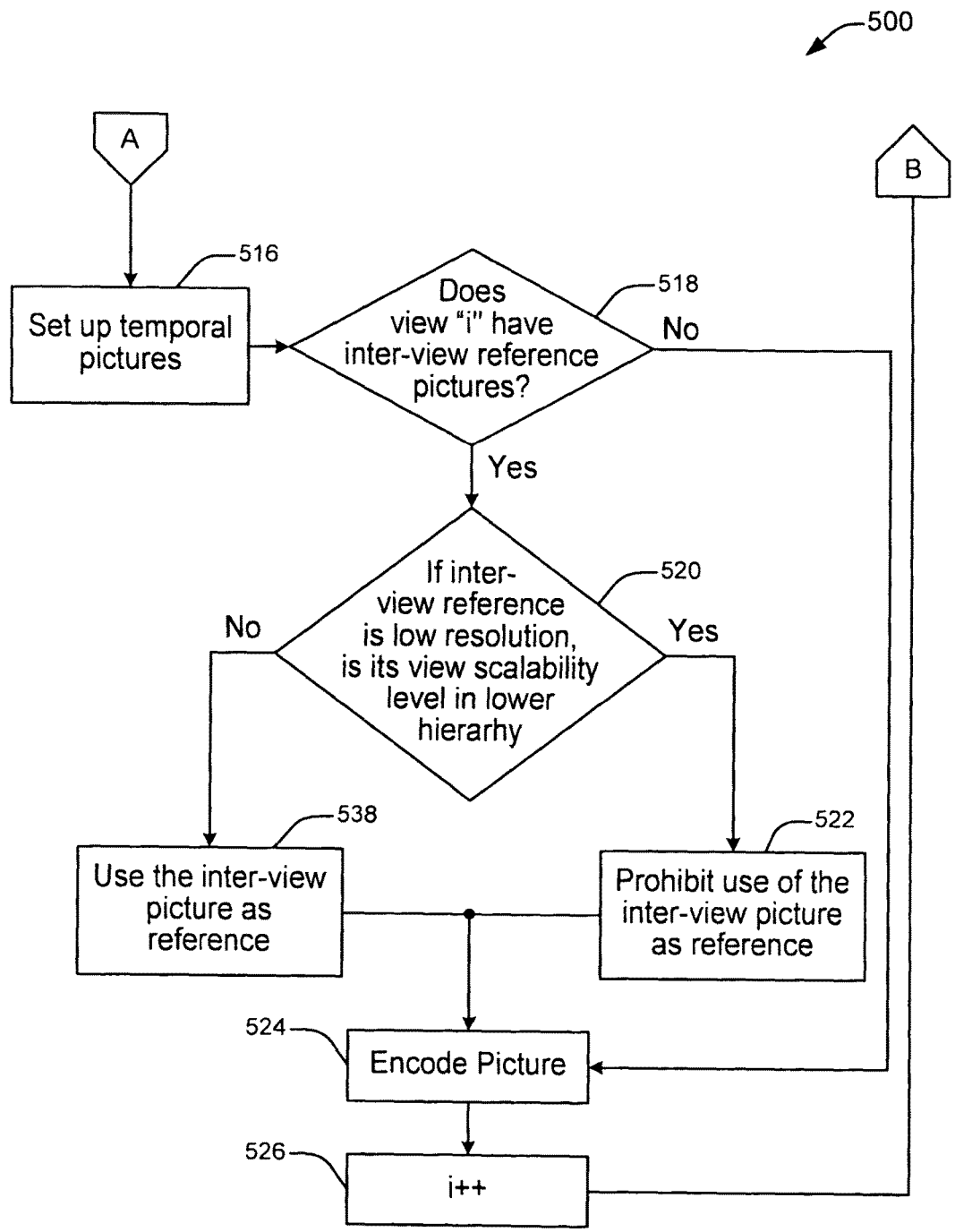

Turning to FIG. 5, which refers generally to FIGS. 5A and 5B, an exemplary method for encoding a picture is indicated generally by the reference numeral 500.

The method 500 includes a start block 502 that passes control to a function block 504. The function block 504 reads configuration parameters for the encoder, and passes control to a function block 506. The function block 506 checks that the resolution of the current view is based on its position in a scalability hierarchy, and passes control to a function block 508. In checking that the resolution is based on position in a scalability hierarchy, block 506 tests that the resolution of the current view does not violate its position in a scalability hierarchy. For example, in a typical application a lower position would have a lower resolution, and a higher position would have a higher resolution.

The function block 508 sets view_res for view "i" in a high level syntax (e.g., a high level syntax included in any of a SPS, a PPS, a slice header, a NAL unit header, etc.), and passes control to a function block 510. The function block 510 lets the number of views be equal to a variable N, initializes a variable i and a variable j to zero, and passes control to a decision block 512. The decision block 512 determines whether or not the current value of the variable i is less than the current value of the variable N. If so, the control is passed to a decision block 514. Otherwise, control is passed to a decision block 528.

The decision block 514 determines whether or not the current value of the variable j is less than the number of pictures in view i. If so, then control is passed to a function block 516. Otherwise, control is passed to a function block 536.

The function block 516 sets up the temporal pictures, and passes control to a decision block 518. The decision block 518 determines whether or not view "i" has inter-view reference pictures. If so, the control is passed to a decision block 520. Otherwise, control is passed to a function block 524.

The decision block 520 determines whether or not the view scalability level of the inter-view reference is in a lower portion of the scalability hierarchy than the current picture when the inter-view reference is of a low resolution. If so, the control is passed to a function block 522. Otherwise, control is passed to a function block 538.

Various other implementations operate more generally in decision block 520. Such other implementations only consider whether the inter-view reference has a position in a view scalability level hierarchy that is the same as, or higher (and thus having a resolution that is the same as or higher), than the position for the current picture. A higher position in a view scalability level hierarchy corresponds to a higher resolution, but typically also corresponds to a lower value for the position. For example, level 0 is typically higher resolution than level 1. Various other implementations number the levels in the opposite order, however.

The function block 522 prohibits the use of the inter-view picture as a reference for the current picture, and passes control to the function block 524. The function block 524 encodes the picture, and passes control to a function block 526. The function block 526 increments the variable i, and returns control to the decision block 512.

The function block 536 increments the variable i, resets frame_num and the picture order count (POC), and returns control to the decision block 512.

The function block 538 uses the inter-view picture as a reference for the current picture, and passes control to the function block 524.

The decision block 528 determines whether or not the SPS, PPS, and/or VPS (and/or any other syntax structure and/or syntax element that is used for the purposes of the present principles) are to be sent in-band. If so, then control is passed to a function block 530. Otherwise, control is passed to a function block 532.

The function block 530 sends the SPS, PPS, and/or VPS in-band, and passes control to a function block 534.

The function block 534 writes the bitstream to a file or streams the bitstream over a network, and passes control to an end block 599.

The function block 532 sends the SPS, PPS, and/or VPS out-of-band, and passes control to the function block 534.

Figure 6A:
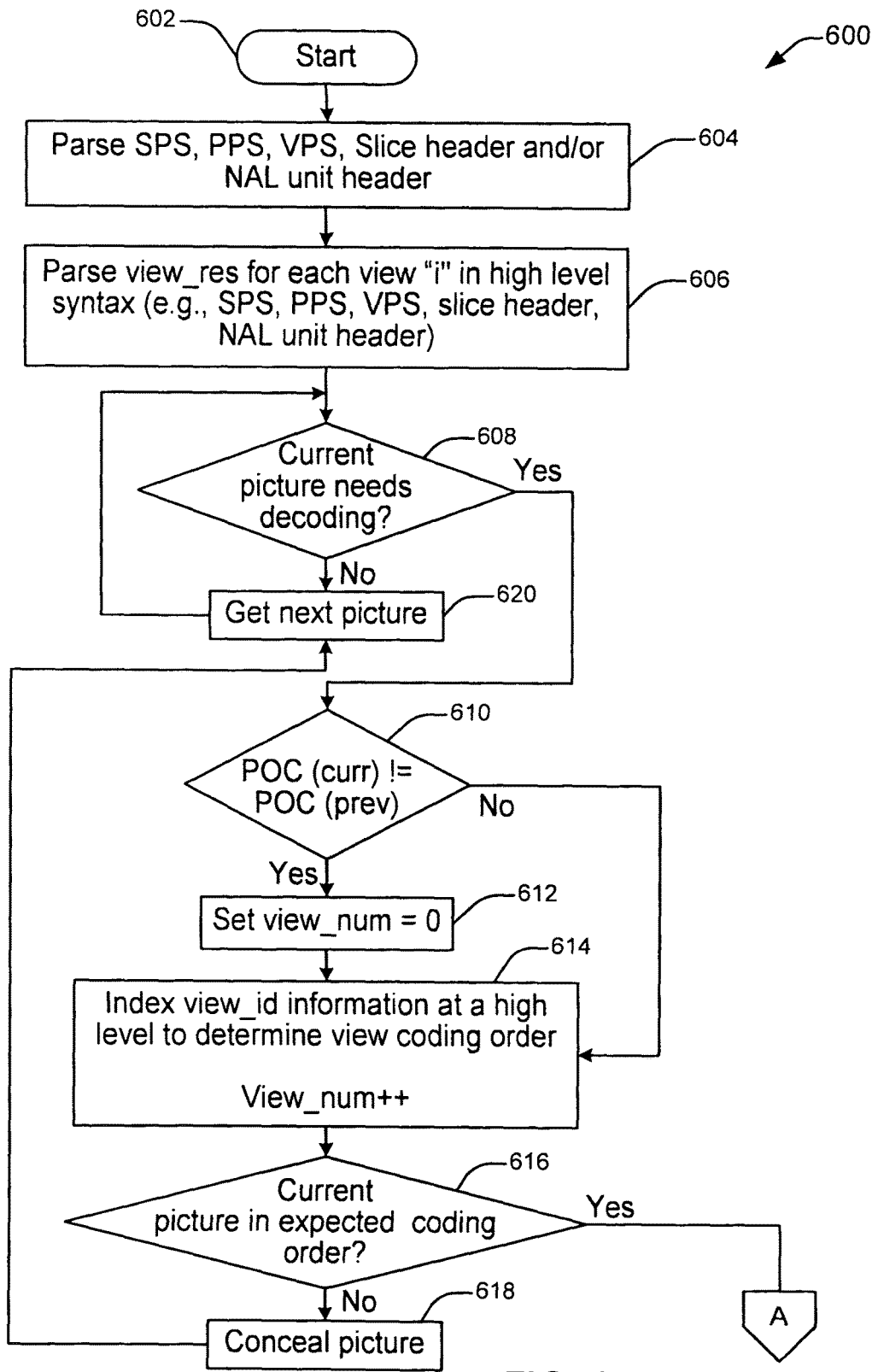
FIGS. 6A and 6B are a flow diagram for an exemplary method for decoding a picture, in accordance with an embodiment of the present principles.
Figure 6B:
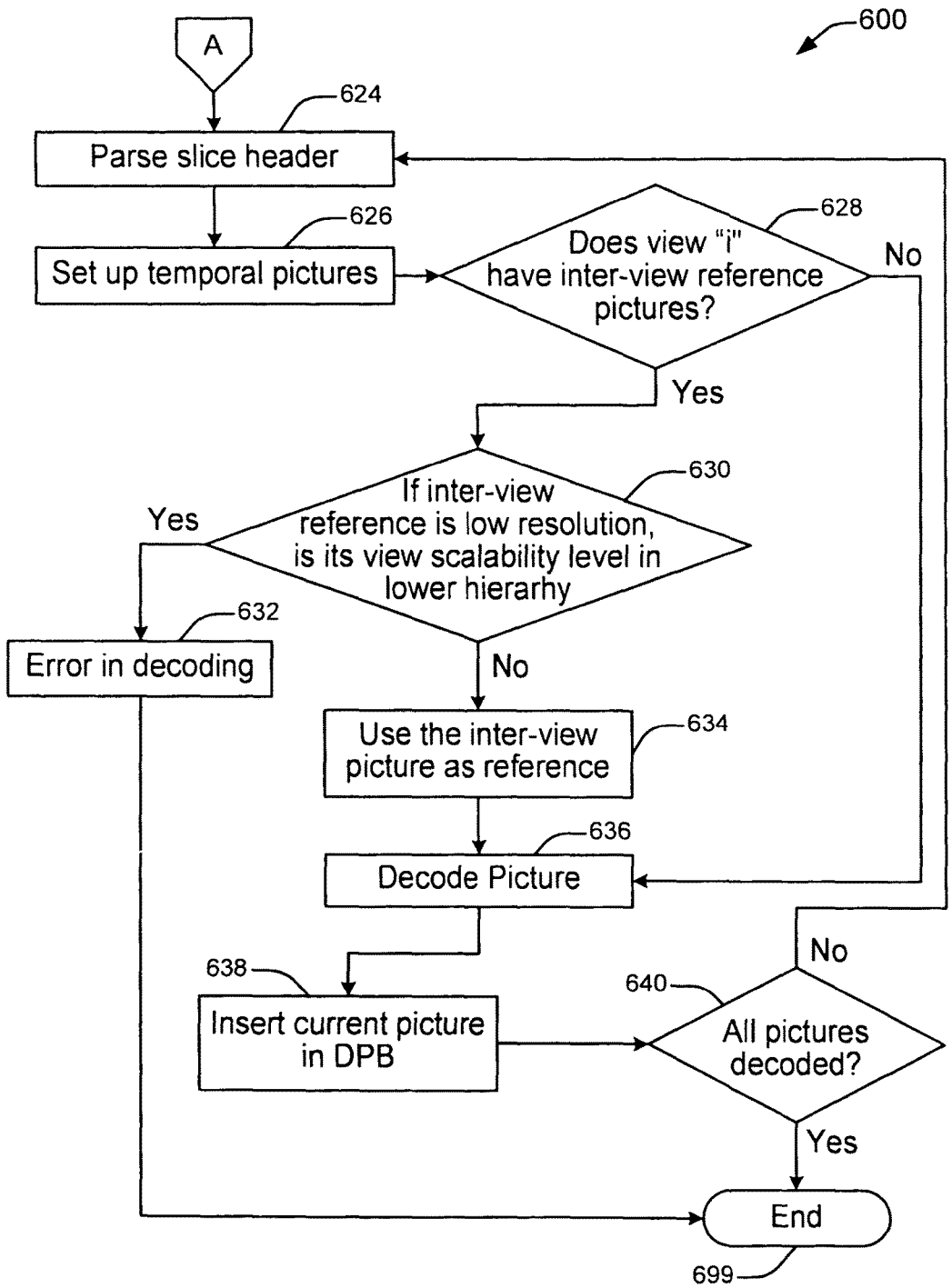

Turning to FIG. 6, which refers generally to FIGS. 6A and 6B, an exemplary method for decoding a picture is indicated generally by the reference numeral 600.

The method 600 includes a start block 602 that passes control to a function block 604. The function block 604 parses the SPS, PPS, VPS, slice header, and/or NAL unit header, and passes control to a function block 606. The function block 606 parses view_res for each view "i" in the high level syntax (e.g., the high level syntax included in any of a SPS, a PPS, a VPS, a slice header, and/or a NAL unit header), and passes control to a decision block 608. The decision block 608 determines whether or not the current picture needs decoding. If so, then control is passed to a decision block 610. Otherwise, control is passed to a function block 620.

The decision block 610 determines whether or not the current value of the Picture Order Count (POC) is equal to a previous value of the POC. If so, then control is passed to a function block 612. Otherwise, control is passed to a function block 614.

The function block 612 sets the syntax element view_num equal to zero, and passes control to the function block 614.

The function block 614 indexes view_id information at a high level to determine view coding order, increments view_num, and passes control to a decision block 616. The decision block 616 determines whether or not the current picture is in the expected coding order. If so, then control is passed to a function block 624. Otherwise, control is passed to a function block 618.

The function block 624 parses the slice header, and passes control to a function block 626. The function block 626 sets up the temporal pictures, and passes control to a decision block 628. The decision block 628 determines whether or not view "i" has inter-view reference pictures. If so, then control is passed to a decision block 630. Otherwise, control is passed to a function block 636.

The decision block 630 determines whether or not the view scalability level of the inter-view reference is in a lower position in the scalability hierarchy than the current picture when the inter-view reference is of low resolution. If so, the control is passed to a function block 632. Otherwise, control is passed to a function block 634.

Various other implementations operate more generally in decision block 630. Such other implementations only consider whether the inter-view reference has a position in a view scalability level hierarchy that is the same as, or higher (and thus having a resolution that is the same as or higher), than the position for the current picture. A higher position in a view scalability level hierarchy corresponds to a higher resolution, but typically also corresponds to a lower value for the position. For example, level 0 is typically higher resolution than level 1. Various other implementations number the levels in the opposite order, however.

Additionally, decision block 630 is not used in all implementations. Various other implementations simply decode the received encoded stream, and assume that inter-view reference pictures have a resolution that is at least as high as the current picture.

The function block 632 indicates and/or otherwise ascertains the existence of an error in the decoding, and passes control to an end block 699.

The function block 620 gets the next picture, and returns control to the decision block 608.

The function block 618 conceals the current picture, and passes control to the function block 620.

The function block 634 uses the inter-view picture as a reference for the current picture, and passes control to a function block 636. The function block 636 decodes the picture, and passes control to a function block 638. The function block 638 inserts the current picture in the decoded picture buffer (DPB), and passes control to a decision block 640. The decision block 640 determines whether or not all pictures have been decoded. If so, then control is passed to the end block 699. Otherwise, control is returned to the function block 624.

Figure 7A:
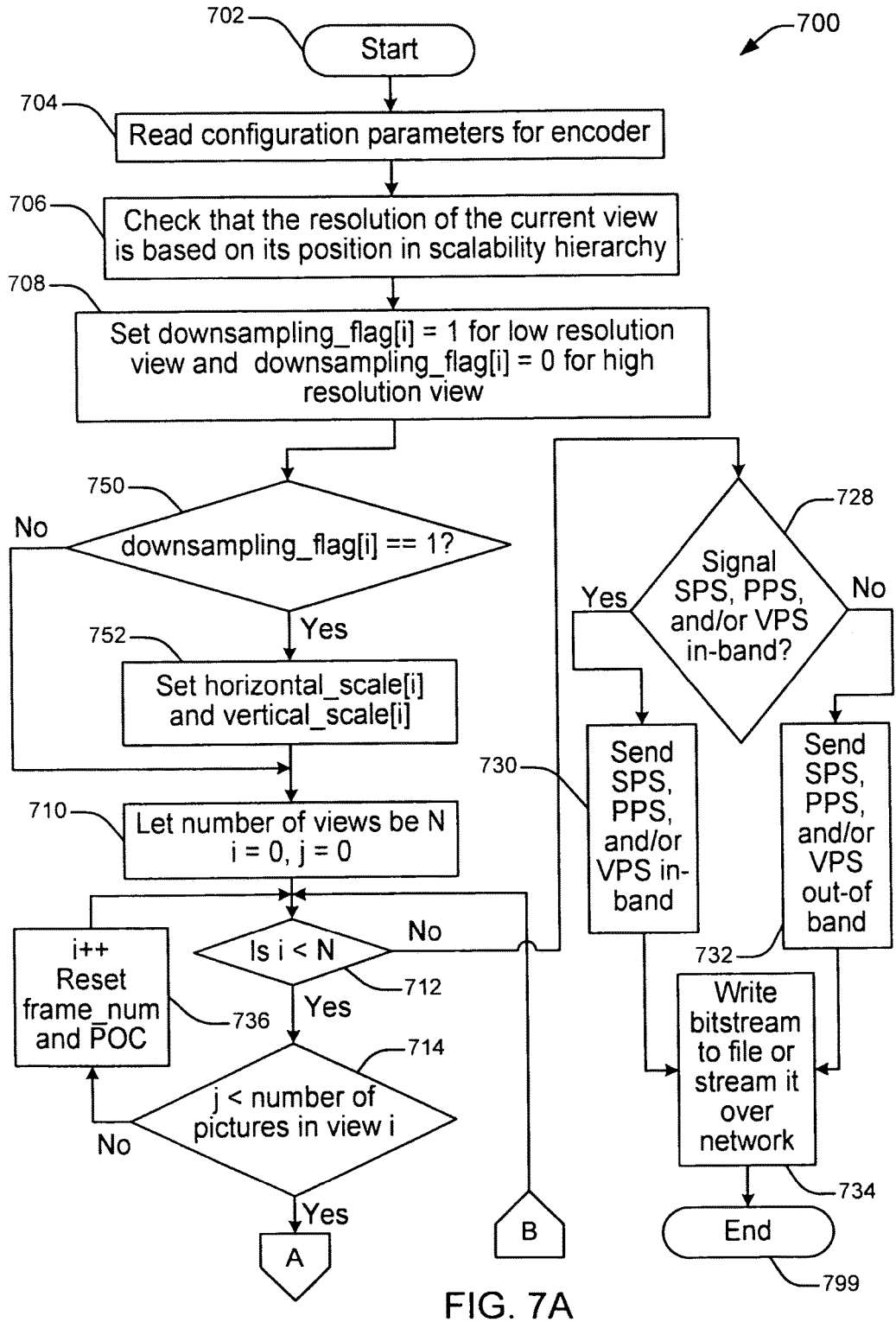
FIGS. 7A and 7B are a flow diagram for an exemplary method for encoding a picture, in accordance with another embodiment of the present principles.
Figure 7B:
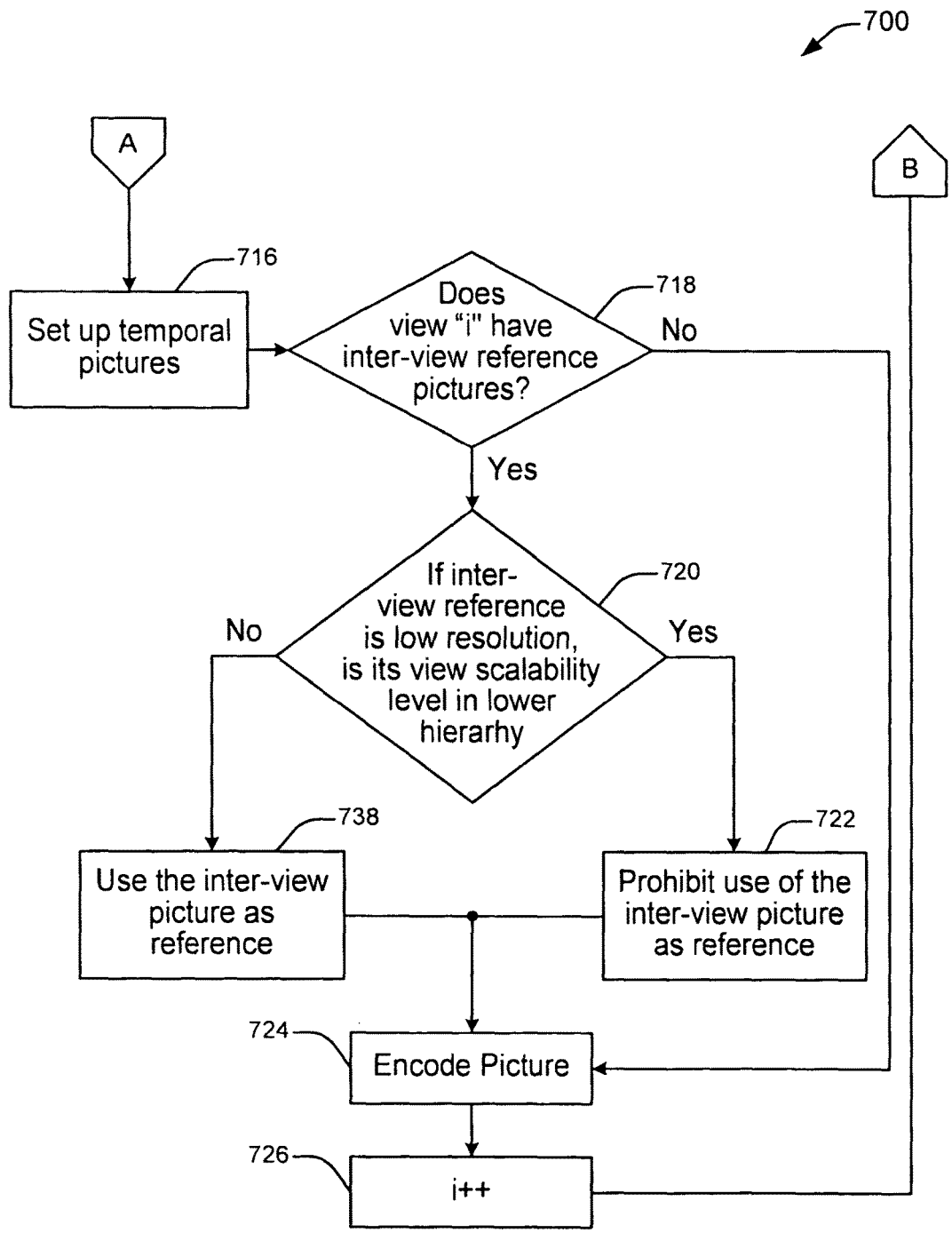

Turning to FIG. 7, which refers generally to FIGS. 7A and 7B, an exemplary method for encoding a picture is indicated generally by the reference numeral 700.

The method 700 includes a start block 702 that passes control to a function block 704. The function block 704 reads configuration parameters for the encoder, and passes control to a function block 706. The function block 706 checks that the resolution of the current view is based on its position in a scalability hierarchy, and passes control to a function block 708.

In checking that the resolution is based on position in a scalability hierarchy, block 706 tests that the resolution of the current view does not violate its position in a scalability hierarchy. For example, in a typical application a lower position would have a lower resolution, and a higher position would have a higher resolution.

The function block 708 sets downsampling_flag[i] equal to one for a low resolution view, sets downsampling_flag[i] equal to zero for a full resolution view, and passes control to a decision block 750. The decision block 750 determines whether or not downsampling_flag[i] is equal to one. If so, then control is passed to a function block 752. Otherwise, control is passed to a function block 710.

The function block 752 sets a syntax element horizontal_scale[i] and a syntax element vertical_scale[i], and passes control to the function block 710.

The function block 710 lets the number of views be equal to a variable N, initializes a variable i and a variable j to zero, and passes control to a decision block 712. The decision block 712 determines whether or not the current value of the variable i is less than the current value of the variable N. If so, the control is passed to a function block 714. Otherwise, control is passed to a function block 728.

The function block 714 determines whether or not the current value of the variable j is less than the number of pictures in view i. If so, then control is passed to a function block 716. Otherwise, control is passed to a function block 736.

The function block 716 sets up the temporal pictures, and passes control to a decision block 718. The decision block 718 determines whether or not view "i" has inter-view reference pictures. If so, the control is passed to a decision block 720. Otherwise, control is passed to a function block 724.

The decision block 720 determines whether or not the view scalability level of the inter-view reference is in a lower portion of the scalability hierarchy than the current picture when the inter-view reference is of a low resolution. If so, the control is passed to a function block 722. Otherwise, control is passed to a function block 738.

Various other implementations operate more generally in decision block 720. Such other implementations only consider whether the inter-view reference has a position in a view scalability level hierarchy that is the same as, or higher (and thus having a resolution that is the same as or higher), than the position for the current picture. A higher position in a view scalability level hierarchy corresponds to a higher resolution, but typically also corresponds to a lower value for the position. For example, level 0 is typically higher resolution than level 1. Various other implementations number the levels in the opposite order, however.

The function block 722 prohibits the use of the inter-view picture as a reference for the current picture, and passes control to the function block 724. The function block 724 encodes the picture, and passes control to a function block 726. The function block 726 increments the variable i, and returns control to the decision block 712.

The function block 736 increments the variable i, resets frame_num and the picture order count (POC), and returns control to the decision block 712.

The function block 738 uses the inter-view picture as a reference for the current picture, and passes control to the function block 724.

The decision block 728 determines whether or not the SPS, PPS, and/or VPS (and/or any other syntax structure and/or syntax element that is used for the purposes of the present principles) are to be sent in-band. If so, then control is passed to a function block 730. Otherwise, control is passed to a function block 732.

The function block 730 sends the SPS, PPS, and/or VPS in-band, and passes control to a function block 734.

The function block 734 writes the bitstream to a file or streams the bitstream over a network, and passes control to an end block 799.

The function block 732 sends the SPS, PPS, and/or VPS out-of-band, and passes control to the function block 734.

Figure 8A:
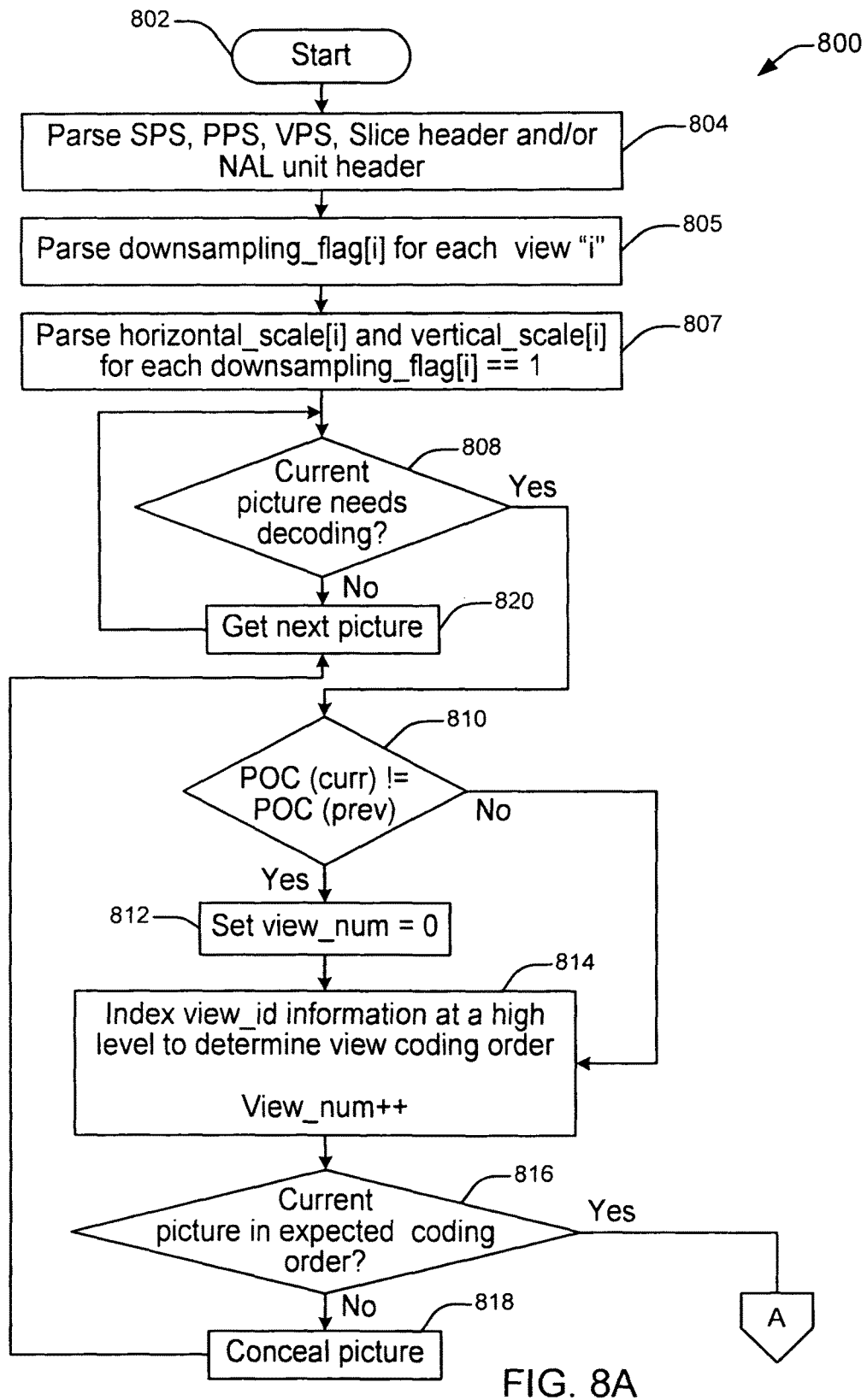
FIGS. 8A and 8B are a flow diagram for an exemplary method for decoding a picture, in accordance with another embodiment of the present principles.
Figure 8B:
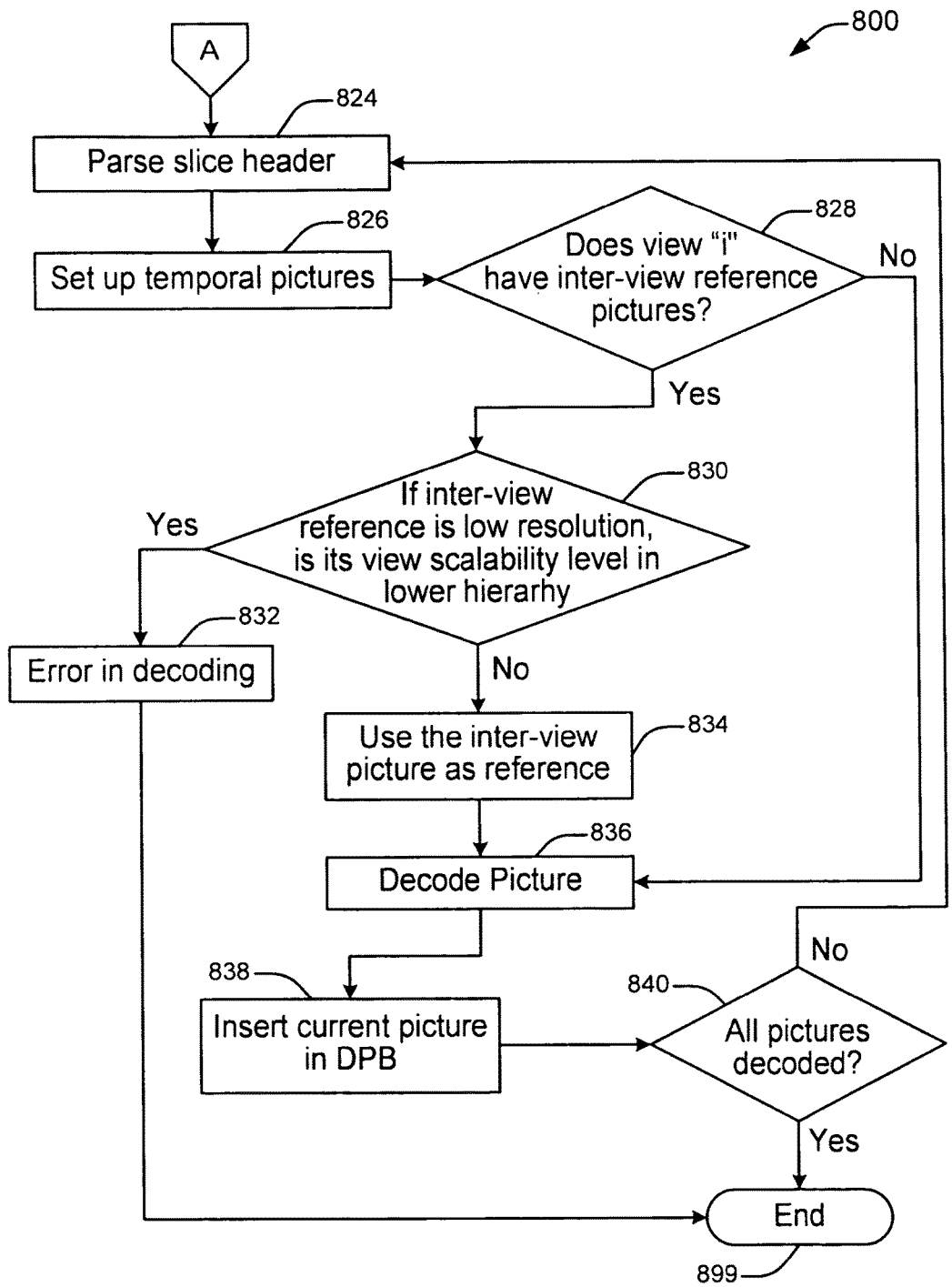

Turning to FIG. 8, which refers generally to FIGS. 8A and 8B, an exemplary method for decoding a picture is indicated generally by the reference numeral 800.

The method 800 includes a start block 802 that passes control to a function block 804. The function block 804 parses the SPS, PPS, VPS, slice header, and/or NAL unit header, and passes control to a function block 805. The function block 805 parses downsampling_flag[i] for each view "i", and passes control to a function block 807. The function block 807 parses horizontal_scale[i] and vertical_scale[i] for each downsampling_flag[i] equal to one, and passes control to a decision block 808. The decision block 808 determines whether or not the current picture needs decoding. If so, then control is passed to a decision block 810. Otherwise, control is passed to a function block 820.

The decision block 810 determines whether or not the current value of the Picture Order Count (POC) is equal to a previous value of the POC. If so, then control is passed to a function block 812. Otherwise, control is passed to a function block 814.

The function block 812 sets the syntax element view_num equal to zero, and passes control to the function block 814.

The function block 814 indexes view_id information at a high level to determine view coding order, increments view_num, and passes control to a decision block 816. The decision block 816 determines whether or not the current picture is in the expected coding order. If so, then control is passed to a function block 824. Otherwise, control is passed to a function block 818.

The function block 824 parses the slice header, and passes control to a function block 826. The function block 826 sets up the temporal pictures, and passes control to a decision block 828. The decision block 828 determines whether or not view "i" has inter-view reference pictures. If so, then control is passed to a decision block 830. Otherwise, control is passed to a function block 836.

The decision block 830 determines whether or not the view scalability level of the inter-view reference is in a lower position in the scalability hierarchy than the current picture when the inter-view reference is of low resolution. If so, the control is passed to a function block 832. Otherwise, control is passed to a function block 834.

Various other implementations operate more generally in decision block 830. Such other implementations only consider whether the inter-view reference has a position in a view scalability level hierarchy that is the same as, or higher (and thus having a resolution that is the same as or higher), than the position for the current picture. A higher position in a view scalability level hierarchy corresponds to a higher resolution, but typically also corresponds to a lower value for the position. For example, level 0 is typically higher resolution than level 1. Various other implementations number the levels in the opposite order, however.

Additionally, decision block 830 is not used in all implementations. Various other implementations simply decode the received encoded stream, and assume that inter-view reference pictures have a resolution that is at least as high as the current picture.

The function block 832 indicates and/or otherwise ascertains the existence of an error in the decoding, and passes control to an end block 899.

The function block 820 gets the next picture, and returns control to the decision block 808.

The function block 818 conceals the current picture, and passes control to the function block 820.

The function block 834 uses the inter-view picture as a reference for the current picture, and passes control to a function block 836. The function block 836 decodes the picture, and passes control to a function block 838. The function block 838 inserts the current picture in the decoded picture buffer (DPB), and passes control to a decision block 840. The decision block 840 determines whether or not all pictures have been decoded. If so, then control is passed to the end block 899. Otherwise, control is returned to the function block 824.

Figures 9, 10:
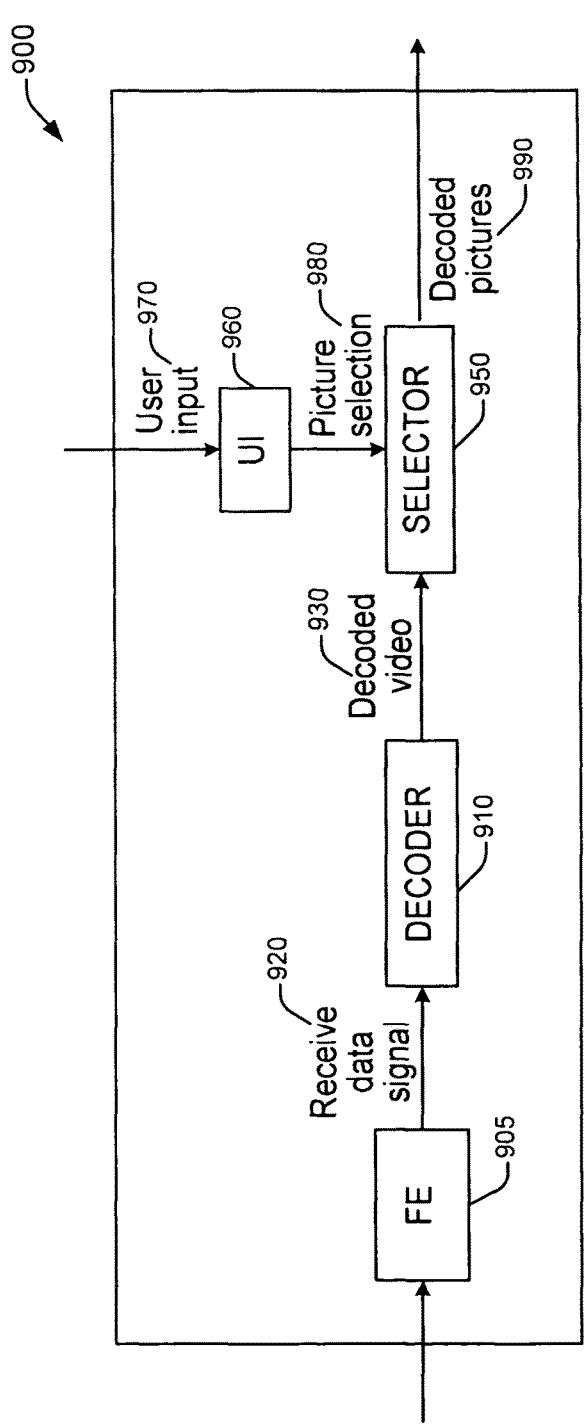
FIG. 9 is a block diagram showing a receiving device for decoding pictures.
FIG. 10 is a table showing an implementation of a correspondence between views, resolutions, and view levels.

Referring to FIG. 9, a video processing device 900 is shown. The video processing device 900 may be, for example, a set top box or other device that receives encoded video and provides, for example, decoded video for display to a user or for storage. Thus, the device 900 may provide its output to a television, computer monitor, or a computer or other processing device.

The device 900 includes a front-end device 905 and a decoder 910. The front-end device 905 may be, for example, a receiver adapted to receive a program signal having a plurality of bitstreams representing encoded pictures, and to select a bitstream for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 905 may receive the program signal from, for example, an antenna (not shown). The front-end device 905 provides a received data signal to the decoder 910.

The decoder 910 receives a data signal 920. The data signal 920 may include, for example, an AVC, an SVC, or an MVC compatible stream. The decoder 910 decodes all or part of the received signal 920 and provides as output a decoded video signal 930. The decoded video 930 is provided to a selector 950. The device 900 also includes a user interface 960 that receives a user input 970. The user interface 960 provides a picture selection signal 980, based on the user input 970, to the selector 950. The picture selection signal 980 and the user input 970 indicate which of multiple pictures, sequences, scalable versions, or other selections of the available decoded data a user desires to have displayed. The selector 950 provides the selected picture(s) as an output 990. The selector 950 uses the picture selection information 980 to select which of the pictures in the decoded video 930 to provide as the output 990.

In various implementations, the selector 950 includes the user interface 960, and in other implementations no user interface 960 is needed because the selector 950 receives the user input 970 directly without a separate interface function being performed. The selector 950 may be implemented in software or as an integrated circuit, for example. In one implementation, the selector 950 is incorporated with the decoder 910, and in another implementation the decoder 910, the selector 950, and the user interface 960 are all integrated.

In one application, front-end 905 receives a broadcast of various television shows and selects one for processing. The selection of one show is based on user input of a desired channel to watch. Although the user input to front-end device 905 is not shown in FIG. 9, front-end device 905 receives the user input 970. The front-end 905 receives the broadcast and processes the desired show by demodulating the relevant part of the broadcast spectrum, and decoding any outer encoding of the demodulated show. The front-end 905 provides the decoded show to the decoder 910. The decoder 910 is an integrated unit that includes devices 960 and 950. The decoder 910 thus receives the user input, which is a user-supplied indication of a desired view to watch in the show. The decoder 910 decodes the selected view, as well as any required reference pictures from other views, and provides the decoded view 990 for display on a television (not shown).

Continuing the above application, the user may desire to switch the view that is displayed and may then provide a new input to the decoder 910. After receiving a "view change" from the user, the decoder 910 decodes both the old view and the new view, as well as any views that are in between the old view and the new view. That is, the decoder 910 decodes any views that are taken from cameras that are physically located in between the camera taking the old view and the camera taking the new view. The front-end device 905 also receives the information identifying the old view, the new view, and the views in between. Such information may be provided, for example, by a controller (not shown in FIG. 9) having information about the locations of the views, or the decoder 910. Other implementations may use a front-end device that has a controller integrated with the front-end device.

The decoder 910 provides all of these decoded views as output 990. A post-processor (not shown in FIG. 9) interpolates between the views to provide a smooth transition from the old view to the new view, and displays this transition to the user. After transitioning to the new view, the post-processor informs (through one or more communication links not shown) the decoder 910 and the front-end device 905 that only the new view is needed. Thereafter, the decoder 910 only provides as output 990 the new view.

Referring to FIG. 10, there is shown a table 1000 that shows a correspondence between view level, resolution, and view numbers, for one implementation. In this implementation, there are five views taken from camera positions that are physically close to one another. These views are numbered from left to right as 0, 1, 2, 3, and 4. Views 0 and 4 are designated as the most important and so are assigned view level 0 and a high resolution. The middle view 2 is designated as the next level of importance and so is assigned a view level 1 and a medium resolution. Remaining views 1 and 3 are designated as the least important and so are assigned view level 2 and a low resolution. The rationale behind the designations and assignments is that all interior views 1, 2, and 3 could be interpolated from exterior views 0 and 4, if for example, views 1, 2, and 3 had errors. Additionally, interior views 1 and 3 could also be interpolated from views 0 and 2, and from views 2 and 4, respectively.

An encoder could be provided with a table such as table 1000 for use in encoding. For example, table 1000 may be provided in a configuration file, and an encoder may use table 1000 in determining a view coding-order and the resolution for the different views. Alternatively, a table such as table 1000 might not be provided explicitly, but rather that information may be implicitly provided by the selection of appropriate values for parameters such as, for example, view coding-order and view resolutions. For example, an encoder may be provided with the resolution for each view number. Based on that resolution information, the encoder may then determine the possible inter-view reference views for each view, and may then determine a corresponding view coding-order.

Continuing with the example of FIG. 10, such a system may provide the advantages of, for example, increased flexibility and bit savings in encoding. For example, other implementations may determine resolution based on view type (for example, I view, P view, and B view types). In such systems, for example, P views may be assigned high resolution, and B views may be assigned low resolution. In such systems, there is no flexibility to encode P views with low resolution. Accordingly, if a sequence of pictures includes numerous P views, all of those P views will be encoded at high resolution which requires a higher number of bits. However, it may be advantageous to encode many of the P views with low resolution. In contrast, for implementations that assign resolution based on a hierarchy, it will generally be possible to encode many of the P views with low resolution. For example, using the five-view example from FIG. 10, views 1 and 3 may include P views and those P views would be encoded with low resolution. Thus, the five-view example may provide, for example, a bit savings.

We thus provide one or more implementations having particular features and aspects. However, features and aspects of described implementations may also be adapted for other implementations. Implementations may signal information using a variety of techniques including, but not limited to, one or more of the following: SPS syntax; other high level syntax; non-high-level syntax; out-of-band information; and implicit signaling. Accordingly, although implementations described herein may be described in a particular context, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit.

As should be evident to one of skill in the art, implementations may also produce a signal formatted to carry information that may be, for example, stored or transmitted. The information may include, for example, instructions for performing a method, or data produced by one of the described implementations. For example, a signal may be formatted to carry as data values for syntax described in one or more implementations, or even the syntax instructions themselves if the syntax is being transmitted, for example.

Additionally, many implementations may be implemented in one or more, or a combination of, a pre-processor, an encoder, a decoder, or a post-processor.

Further, other implementations are contemplated by this disclosure. For example, additional implementations may be created by combining, deleting, modifying, or supplementing various features of the disclosed implementations.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally; the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a computer readable medium having instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method, comprising:
accessing at least a portion of an encoded picture, the encoded picture being from a particular view of multiple views, and the portion being encoded at a resolution;
determining the resolution of the particular view for at least the portion from information identifying an assigned view level and a resolution corresponding to the view level; and
decoding at least the portion based on the determined resolution,
wherein the determining comprises identifying the resolution for the particular view based on a position of the view level in a scalability hierarchy, the position being indicated by a particular view level and the scalability hierarchy provides scalability at least by allowing that pictures from a given position in the scalability hierarchy to be used as an inter-view reference for pictures from a less important position in the scalability hierarchy and not to be used as a reference for pictures from a more important position in the scalability hierarchy, and resolution for a picture from a given position in the scalability hierarchy being as good as resolution for a picture from a less important position in the scalability hierarchy, and wherein inter-view reference pictures are downsampled from a higher resolution picture before being used as a reference for pictures from a less important position in the scalability hierarchy.

2. The method of claim 1, wherein:
resolution for a picture from a given position in the scalability hierarchy is at least as good as resolution for a picture from a less important position in the scalability hierarchy.

3. The method of claim 1, wherein the determining of the particular resolution comprises:
accessing an indicator from the information that indicates a view level position in a scalability hierarchy for the particular view; and
determining the particular resolution based on the view level position in the scalability hierarchy.

4. The method of claim 3, wherein the encoded picture and the indicator are accessed from data formatted according to a particular video coding standard.

5. The method of claim 1, further comprising:
accessing multiple encoded pictures, the multiple encoded pictures being from the particular view and being encoded at the particular resolution; and
decoding the multiple encoded pictures based on the particular resolution.

6. The method of claim 5, wherein the multiple encoded pictures belong to one or more of a group of pictures, a scene, or a movie.

7. An apparatus, comprising:
a memory, and
a processor, configured to:
access at least a portion of an encoded picture, the encoded picture being from a particular view of multiple views, and the portion being encoded at a resolution;
determine the resolution of the particular view for at least the portion from information identifying an assigned view level and a resolution corresponding to the view level; and
decode at least the portion based on the determined resolution,
wherein the determining comprises identifying the resolution for the particular view based on a position of the view level in a scalability hierarchy, the position being indicated by a particular view level and the scalability hierarchy provides scalability at least by allowing that pictures from a given position in the scalability hierarchy to be used as an inter-view reference for pictures from a less important position in the scalability hierarchy and not to be used as a reference for pictures from a more important position in the scalability hierarchy, and resolution for a picture from a given position in the scalability hierarchy being as good as resolution for a picture from a less important position in the scalability hierarchy, and wherein inter-view reference pictures are downsampled from a higher resolution picture before being used as a reference for pictures from a less important position in the scalability hierarchy.

* * * * *